United States Patent Office 3,474,128
Patented Oct. 21, 1969

3,474,128
DERIVATIVES OF MALONIC ACID
Rudolf G. Griot, Florham Park, N.J., assignor to Sandoz Inc., Hanover, N.J.
No Drawing. Continuation-in-part of application Ser. No. 529,934, Feb. 25, 1966, which is a continuation-in-part of application Ser. No. 519,459, Jan. 10, 1966. This application Aug. 2, 1966, Ser. No. 569,578
Int. Cl. C07c 69/38; A61k 27/00
U.S. Cl. 260—473
27 Claims

ABSTRACT OF THE DISCLOSURE

The compounds are useful therapeutically as hypocholesteremics/hypolipemics and have the formula

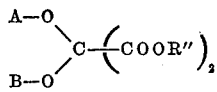

R″ is lower alkyl, A may be phenyl or substituted phenyl and B is substituted phenyl which otherwise may be like or unlike A, e.g., bis(p-chlorophenoxy)malonic acid diethyl ester. The substituents include trifluoromethyl, (lower) alkanoylamide, (lower)alkylthio, cyclo(lower)alkyl, phenyl, phenoxy, phenylthio, anilino, benzoyl, phenyl(lower)alkyl, halogen, (lower)alkyl and nitro.

This application is a continuation-in-part of my copending application, Ser. No. 529,934 filed Feb. 25, 1966 now abandoned, which in turn is a continuation-in-part of my copending application, Ser. No. 519,459 filed Jan. 10, 1966 now abandoned, This invention relates to derivatives of malonic acid. In particular, the invention is concerned with di-substituted malonic acid esters.

The compounds of the present invention may be represented structurally as follows:

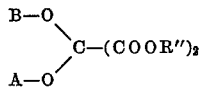

wherein:

A is either

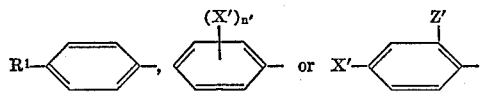

B is

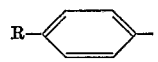

when A is either

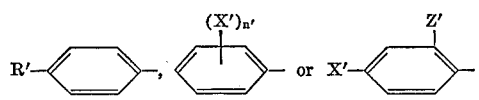

B is

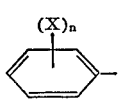

when A is either

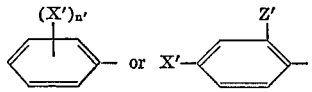

B is

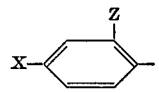

when A is

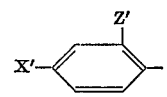

R is hydrogen; trifluoromethyl; loweralkanoylamido, preferably containing from 2 to 4 carbon atoms, e.g., acetamido, propionamido and butyrylamido; loweralkylthio, preferably containing from 1 to 4 carbon atoms, e.g., methylthio, ethylthio, propylthio and butylthio; cycloloweralkyl, preferably containing from 5 to 7 carbon atoms, e.g., cyclopentyl, cyclohexyl and cycloheptyl; or an aromatic moiety of the formula

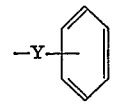

R' is trifluoromethyl; loweralkanoylamide, preferably containing from 2 to 4 carbon atoms, e.g., acetamido, propionamido and butyrylamido; loweralkylthio, preferably containing from 1 to 4 carbon atoms, e.g., methylthio, ethylthio, propylthio and butylthio; cycloloweralkyl, preferably containing from 5 to 7 carbon atoms, e.g., cyclopentyl, cyclohexyl and cycloheptyl; or an aromatic moiety of the formula

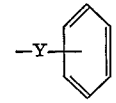

Y is either a direct bond or a bridging member of the group oxygen; sulfur; imino; carbonyl; or a straight chain loweralkylene, preferably containing from 1 to 4 carbon atoms, e.g., methylene, ethylene and trimethylene;

X and X' are the same or different and represent halogen, preferably having an atomic weight no greater than 80, i.e., fluorine, bromine or chlorine;

R″ represents loweralkyl, preferably containing from 1 to 4 carbon atoms, e.g., methyl, ethyl, propyl, isopropyl, butyl and t-butyl;

Z and Z' are the same or different and represent loweralkyl, preferably containing from 1 to 4 carbon atoms, e.g., methyl, ethyl, propyl and butyl; or nitro; and $n$ and $n'$ are the same or different and represent a whole number of from 1 to 3, inclusive.

The preferred compounds of the present invention are those compounds of structural Formula I wherein A and B are the same and R″ is either methyl or ethyl, e.g., bis-(p-chlorophenoxy)malonic acid diethyl ester.

The compounds of structural Formula I may be prepared by reacting an unsubstituted or appropriately substituted phenolate with an appropriately substituted malonic acid to form the corresponding substituted malonic acid ester derivative. The resulting product is then treated with a halogenating agent to form the corresponding α-halo-derivative and the latter reacted with an appropriately substituted phenolate to form the desired product. This process may be represented structurally as follows:

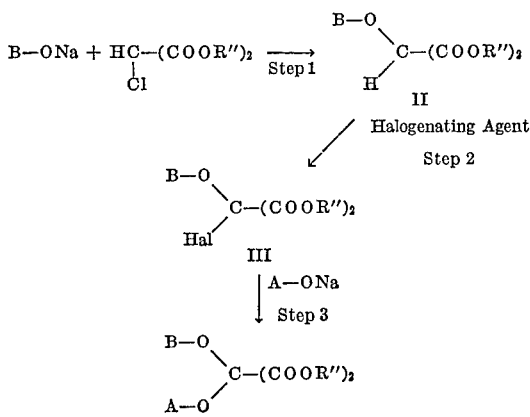

In the above Formulae A, B and R″ are as defined above and Hal represents halogen, preferably chlorine or bromine.

As illustrated above, Step 1 of the process involves the reaction of the phenolate or substituted phenolate with a chloromalonic acid ester to form the corresponding product II. This reaction is conveniently carried out in a suitable inert organic solvent such as dimethylacetamide, diethyl acetamide, dimethylformamide or tetramethylurea. Preferably the reaction is initially carried out at elevated temperatures up to about 80° C. and then allowed to continue at room temperature. The particular solvent employed is not critical. Similarly, the particular temperature employed is not critical provided it does not exceed about 80° C. Recovery of the product (II) can be accomplished in conventional manner.

In Step 2 of the process, the product II is halogenated employing conventional agents for this purpose. The preferred agent is bromine, however, other agents such as chlorine, N-bromosuccinimide or sulfuryl chloride can also be used. The halogenation is conveniently carried out in a suitable inert organic solvent such as haloalkane for example, dichloromethane, chloroform, carbon tetrachloride and the like. Preferably the reaction is initially carried out at room temperature and then allowed to continue at reflux temperature. However, neither the choice of solvent nor temperature employed is critical. The resulting product III is readily recovered employing conventional techniques.

The last step of the process (Step 3) involves the reaction of product III with the appropriately substituted phenolate. This reaction is conveniently effected in a suitable inert organic solvent such as that employed in Step 1. Preferably this reaction is initially carried out at room temperature and then allowed to continue at elevated temperatures up to about 80° C. However, as indicated in Step 1 the choice of solvent or temperature employed is not critical provided that with respect to the latter, it does not exceed about 80° C. The desired product is readily recoverable employing conventional techniques.

The above process can be utilized for the preparation of all of the compounds represented by structural Formula I. Furthermore, it should be noted that the phenolate reactants employed in Steps 1 and 3 can be interchanged, that is, the phenolate of Step 3 can be empolyed as the reactant in Step 1 and the phenolate of Step 1 can be used as the reactant in Step 3.

Various of the phenolates employed as reactants in the above process are known and can be prepared as described in the literature. As to the others which are not specifically known, they can be readily prepared by methods analogous to those described in the literature. In general, such compounds are prepared by reacting the appropriate phenol with commercially available sodium hydride. If such procedure is utilized, it is highly desirable that any oil associated with the sodium hydride be removed prior to using the same. This can readily be accomplished by washing with an inert, dry solvent such as petroleum ether.

Various of the malonic acid derivatives employed as reactants in Step 1 can likewise be prepared as described in the literature. Such others which are not described in the literature may be prepared in analogous manner.

The compounds of structural Formula I wherein A and B are the same may also be prepared by reacting an appropriately substituted phenolate with a dihalomalonic acid ester. This process may be illustrated structurally as follows:

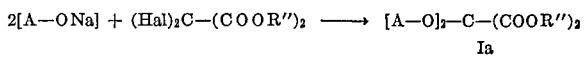

wherein

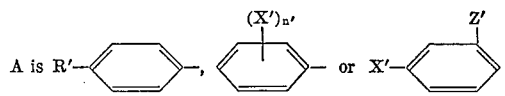

and R′, X′, Z′, R″, Hal and n′ are as defined above.

This reaction is readily carried out in an inert organic solvent such as employed in Step 1 of the previous process and at room temperature, or elevated temperatures up to about 80° C. However, the particular solvent or temperature employed is not critical provided that with respect to the latter, it does not exceed about 80° C. The resulting product (Ia) is readily recovered in conventional manner.

As previously indicated herein above, the phenolates employed in the above process can be prepared as described in the literature or in analogous manner. Similarly, the statement above regarding the preparation of the phenolates employing sodium hydride is equally applicable to the instant process. Various of the dihalomalonic acid esters employed are likewise known and can be prepared as described in the literature. Such others which are not specifically known can be prepared from available materials in analogous manner.

The compounds of Formula I wherein R″ is a branched alkyl, e.g., isopropyl and tertiary butyl, may also be prepared by reacting an appropriately di-substituted malonic acid with an inorganic acid halide to form the corresponding di-subntituted malonyl halide and then reacting the latter with an appropriate alcohol or alcoholate. This process may be illustrated as follows:

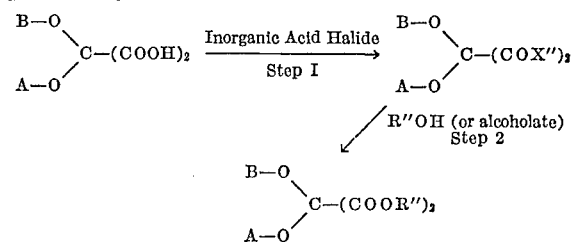

wherein A, B and R″ are as previously defined and X″ represents chlorine or bromine.

The reaction of the malonic acid with the inorganic acid halide (Step 1) is preferably carried out in an inert, anhydrous organic solvent and at an elevated temperature of up to about 50° C. However, the reaction can be carried out in the absence of a solvent or at room temperature, but use of such conditions will adversely affect the yield of the desired malonyl halide. When a solvent is employed, the choice thereof is not critical and any inert solvent in which the malonic acid is soluble can be used. Suitable solvents include diethyl ether, tetrahydrofuran and dioxane and of these diethyl ether is preferred. The inorganic acid halide employed is preferably thionyl chloride although other acid halides commonly employed in reactions of this nature can also be used. Illustrative of these are thionyl bromide and the phosphorus containing acid halides, e.g., phosphorus trichloride. The latter, however, are not as practical as the thionyl halides. To facilitate the reaction, a catalyst such as dimethylformamide may be employed.

The reaction of the malonyl halide with the appropriate alcohol or alcoholate (Step 2) is carried out in conventional manner at room temperature (20° C.) or below employing any suitable inert organic solvent, e.g., diethyl ether and the like, as the reaction medium. The reaction, if desired, can be carried out at elevated temperatures. However, in such instances external cooling should be provided since the reaction is highly exothermic. Preferably, the reaction is carried out at a temperature of from about −10° C. to about 5° C. Where the reaction is carried out employing the free alcohol rather than an alcoholate, it is desirable to provide a means for taking up the liberated hydrogen halide. This can be accomplished by employing an alkali metal carbonate, e.g., potassium carbonate, or a sufficient amount of some other suitable inert base, e.g., pyridine. Where an alcoholate is employed, the alkali metal salts, particularly the sodium and potassium salts, are preferred.

The malonic acids employed as starting materials in the above process are readily prepared by reacting the corresponding di-esters, preferably, the dimethyl or diethyl ester, obtained as described hereinabove, with barium hydroxide in a suitable inert solvent system which is capable of solubilizing both the barium hydroxide and the malonic acid ester. Desirably, the solvent system is composed of a mixture of water and an organic solvent containing such amounts of each as may be necessary to solubilize the barium hydroxide and malonic acid ester, respectively. The particular organic solvent employed is not critical and the selection thereof is dependent upon the degree of solubility of the particular malonic acid ester in said solvent. However, it is preferred to employ an organic solvent which is water-miscible. Suitable solvents include the lower alkanols, e.g., methanol and ethanol, e.g. diethyl ether, dioxane and tetrahydrofuran. The temperature at which the reaction is carried out, however, is critical to the extent that elevated temperatures (i.e., above about 35° C.) should not be employed. Preferably, the reaction is effected at ordinary room temperature (20–25° C.) although lower temperatures can be utilized. The resulting barium salt is converted to the desired malonic acid by treatment with a strong acid at room temperature. This reaction is conveniently carried out in any suitable inert organic solvent such as a lower alkanol, e.g., methanol. Preferably, the solvent is one which is capable of solubilizing the free malonic acid and in which the barium salt, formed during the reaction with the strong acid, is insoluble. Desirably, the acid employed is a mineral acid, preferably sulfuric acid.

Inasmuch as the malonic acids employed in the above process are obtained from the corresponding di-esters, it will be appreciated that such process is primarily useful for preparing those di-esters which are not readily prepared by the other processes described hereinabove because of the commercial unavailability of the chloromalonic acid ester or dihalomalonic acid ester reactants employed therein.

The compounds of structural Formula I are useful because they possess pharmacological activity. In particular the compounds are useful as hypocholesteremics/hypolipemics. For such usage, the compounds may be admixed with conventional pharmaceutical carriers, and other adjuvants, if necessary, and administered orally in such forms as tablets, capsules, elixirs, suspensions or solutions. The dosage administered will, of course, vary depending on the compound employed. However, in general, satisfactory results are obtained when administered at a daily dosage of from about 1 gram to about 2 grams, preferably given in divided doses of from about 250 milligrams to about 1000 milligrams, two to four times a day or in sustained release form. A representative formulation suitable for oral administration is a tablet prepared by standard tabletting techniques and containing 50 parts of bis-(p-chlorophenoxy)-malonic acid diethyl ester, 2 parts of tragacanth, 39.5 parts of lactose, 5 parts of corn starch, 3 parts of talcum and 0.5 part of magnesium stearate.

The following examples show representative compounds contemplated by this invention and the manner in which such compounds are made. In the examples where parts and percentages are designated, they are by weight unless otherwise specified, and the temperatures are in degrees centigrade. The relationship between parts by weight and parts by volume is the same as that between the kilogram and the liter. However, it is to be understood that these examples are intended for purposes of illustration only and are not intended as in any way limiting the scope of the invention which is defined in the appended claims.

EXAMPLE 1

Bis-(4-biphenylyloxy)malonic acid diethyl ester

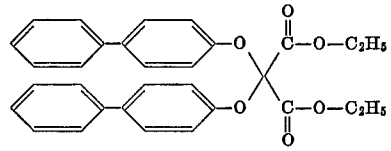

Wash 43.3 parts (1.0 mole) of 56.7% sodium hydride in mineral oil with dry, low boiling petroleum ether. Then suspend the washed sodium hydride in 1500 parts by volume of dimethylacetamide and cool the obtained suspension to 0°. Add 187.2 parts (1.10 moles) of p-phenylphenol to the thus-cooled suspension at such a rate that the temperature thereof does not exceed 10° (external cooling with an ice/salt bath being employed as necessary).

After all of the p-phenylphenol is added, the formed suspension of the phenolate is stirred for an additional hour. Then remove the cooling bath, and add 159 parts (0.5 mole) of diethyldibromomalonate fairly rapidly to said formed suspension, allowing the temperature to rise to about 32°.

Continue stirring for 88 hours. Then evaporate in vacuo ¾ of the solvent. Add 1500 parts by volume of ethylacetate to the resulting concentrate before washing same twice with 1500 parts by volume (each) of water and twice with 750 parts by volume (each) of 2 N (aq.) sodium hydroxide. Separate organic layer and dry over magnesium sulfate. Filter and evaporate solvent to dryness. Add 500 cc. isopropyl ether to crystallize product; wash with cold isopropyl ether. Dry the thus-washed crystals at 80° in vacuo for one hour to obtain the title compound, melting point (M.P.) 107° to 108.5°.

Replacing the diethyldibromomalonate with an equivalent of dibromomalonic acid dimethylester results in the preparation, in similar manner, of bis-(4-biphenylyloxy) malonic acid dimethylester.

EXAMPLE 2

Bis-(p-chlorophenoxy)malonic acid dimethyl ester

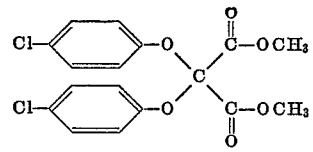

Wash 61 parts of 56.7% sodium hydride in mineral oil with dry, low boiling petroleum ether. Then suspend the washed sodium hydride in 1000 parts by volume of dimethylacetamide and cool the obtained suspension to 0°. Add 200 parts of p-chlorophenol to the thus-cooled suspension at such a rate that the temperature thereof does not exceed 10° (external cooling with an ice/salt bath being employed as necessary).

After all of the p-chlorophenol is added, the mixture is stirred for an additional hour. Then remove the cooling bath, and add a solution of 205 parts of dimethyldibromomalonate in 100 parts by volume of dimethylacetamide fairly rapidly, allowing the temperature to rise to about 32°.

Continue stirring for 88 hours. Then evaporate in vacuo ¾ of the solvent. Add 1500 parts by volume of ethylacetate to the resulting concentrate before washing same twice with 1500 parts by volume (each) of water and twice with 750 parts by volume (each) of 2 N (aq.) sodium hydroxide. Dry the thus-washed organic phase over anhydrous magnesium sulfate, filter the dried organic phase and evaporate the solvent contained in the obtained filtrate to obtain bis-(p-chlorophenoxy)malonic acid dimethyl ester, M.P. 90°.

Replacing the p-chlorophenol with an equivalent of p-phenoxyphenol results in the preparation, in similar manner, of the compound bis-(p-phenoxyphenoxy)malonic acid dimethylester.

EXAMPLE 3

Bis-(p-benzylphenoxy)malonic acid diethyl ester

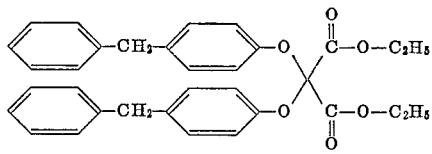

Wash 43.3 parts (1.0 mole) of 56.7% sodium hydride in mineral oil with dry, low boiling petroleum ether. Then suspend the washed sodium hydride in 1500 parts by volume of dimethylacetamide and cool the obtained suspension to 0°. Add 203 parts (1.10 moles) of p-benzylphenol to the thus-cooled suspension at such a rate that the temperature thereof does not exceed 10° (external cooling with an ice/salt bath being employed as necessary).

After all of the p-benzylphenol is added, the formed suspension of the phenolate is stirred for an additional hour. Then remove the cooling bath, and add 159 parts (0.5 mole) of diethyldibromomalonate fairly rapidly to said formed suspension, allowing the temperature to rise to about 32°.

Continue stirring for 88 hours. Then evaporate in vacuo ¾ of the solvent. Add 1500 parts by volume of ethylacetate to the resulting concentrate before washing same twice with 1500 parts by volume (each) of water and twice with 750 parts by volume (each) of 2 N (aq.) sodium hydroxide. Dry the thus-washed organic phase over anhydrous magnesium sulfate, filter the dried organic phase and evaporate the solvent contained in the obtained filtrate to produce an oily residue.

Admix 500 parts by volume of isopropyl ether with the residue to precipitate the title compound as crystals. Cool to 0° prior to filtering out the crystals. Wash the separated crystals with 100 parts by volume of isopropyl ether and then with 500 parts by volume of low boiling petroleum ether. Dry the thus-washed crystals at 80° in vacuo for one hour to obtain the title compound, M.P. 91° to 92.5°.

Replacing the p-benzylphenol with an equivalent of p-(phenylthio)-phenol results in the preparation, in similar manner, of the compound bis-[p-(phenylthio)phenoxy] malonic acid diethyl ester.

EXAMPLE 4

Bis-(p-chlorophenoxy)malonic acid diethyl ester

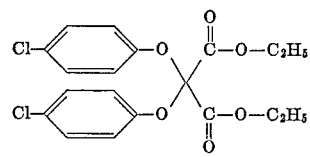

Wash 43.3 parts (1.0 mole) of 56.7% sodium hydride in mineral oil with dry, low boiling petroleum ether. Then suspend the washed sodium hydride in 1500 parts by volume of dimethylacetamide and cool the obtained suspension to 0°. Add 141.4 parts (1.10 moles) of a p-chlorophenol to the thus-cooled suspension at such a rate that the temperature thereof does not exceed 10° (external cooling with an ice-salt bath being employed as necessary).

After all of the p-chlorophenol is added, the mixture is stirred for an additional hour. Then remove the cooling bath, and add 159 parts (0.5 mole) of diethyldibromomalonate fairly rapidly allowing the temperature to rise to about 32°.

Continue stirring for 88 hours. Then evaporate in vacuo ¾ of the solvent. Add 1500 parts by volume of ethylacetate to the resulting concentrate before washing same twice with 1500 parts by volume (each) of water and twice with 750 parts by volume (each) of 2 N (aq.) sodium hydroxide. Dry the thus-washed organic phase over anhydrous magnesium sulfate, filter the dried organic phase and evaporate the solvent contained in the obtained filtrate to produce the desired product. Recrystallization from 95% ethanol affords product, M.P. 48—50° C.

Replacing the p-chlorophenol with an equivalent of p-(amino)-phenol results in the preparation, in similar manner, of the compound bis-(p-anilinophenoxy)malonic acid diethyl ester.

EXAMPLE 5

Bis-(p-bromophenoxy)malonic acid diethyl ester

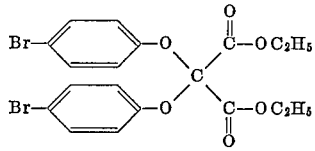

Following the procedure for Example 4 and employing an equivalent amount of p-bromophenol in place of p-chlorophenol used in Example 4, there is obtained the product bis-(p-bromophenoxy)malonic acid diethyl ester, M.P. 73–75° C.

EXAMPLE 6

Bis-(p-fluorophenoxy)malonic acid diethyl ester

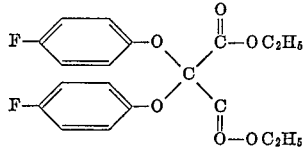

Following the procedure of Example 4 and employing an equivalent amount of p-fluorophenol in place of the p-chlorophenol used in Example 4, there is obtained the product bis-(p-fluorophenoxy)malonic acid diethyl ester, M.P. 50.5–51.5° C.

EXAMPLE 7

Bis-(p-trifluoromethylphenoxy)malonic acid diethyl ester

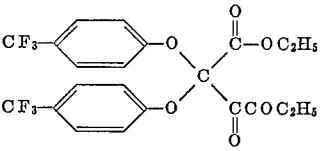

Wash 6.7 parts of 56.7% sodium hydride in mineral oil with dry, low boiling petroleum ether. Then suspend the washed sodium hydride in 100 parts by volume of dimethylacetamide and cool the obtained suspension to 0°. Add to the thus-cooled suspension 25.5 parts of p-trifluoromethylphenol in 25 parts by volume of dimethylacetamide at such a rate that the temperature thereof does not exceed 10° (external cooling with an ice/salt bath being employed as necessary).

After all of the p-trifluoro-ethylphenol is added, the mixture is stirred for an additional hour. Then remove the cooling bath, and add 23.8 parts of diethyldibromomalonate fairly rapidly, allowing the temperature to rise to about 32°.

Continue stirring for 88 hours. Then evaporate in vacuo ¾ of the solvent. Add 1500 parts by volume of ethylacetate to the resulting concentrate before washing same twice with 1500 parts by volume (each) of water and twice with 750 parts by volume (each) of 2 N (aq.) sodium hydroxide. Dry the thus-washed organic phase over anhydrous magnesium sulfate, filter the dried organic phase and evaporate the solvent contained in the obtained filtrate to obtain bis-(p-trifluoromethylphenoxy)malonic acid diethyl ester, M.P. 53.5–54.5°; B.P. 134–136°/0.05 mm.

Replacing the p-trifluoromethylphenol with an equivalent of p-(methylthio)phenol results in the preparation, in similar manner, of the compound bis-[p-(methylthio)phenoxy]malonic acid diethyl ester.

EXAMPLE 8

Bis-(p-acetamidophenoxy)malonic acid diethyl ester

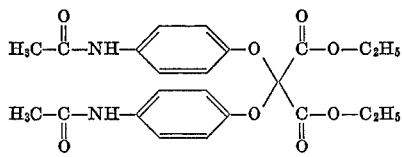

Wash 43.3 parts (1.0 mole) of 56.7% sodium hydride in mineral oil with dry, low boiling petroleum ether. Then suspend the washed sodium hydride in 1500 parts by volume of dimethylacetamide and cool the obtained suspension to 0°. Add 166.1 parts (1.10 moles) of p-acetamidophenol to the thus-cooled suspension at such a rate that the temperature thereof does not exceed 10° (external cooling with an ice/salt bath being employed as necessary).

After all of the p-acetamidophenol is added, the formed suspension of the phenolate is stirred for an additional hour. Then remove the cooling bath, and add 159 parts (0.5 mole) of diethyldibromomalonate fairly rapidly to said formed suspension, allowing the temperature to rise to about 32°.

Continue stirring for 88 hours. Then evaporate in vacuo ¾ of the solvent. Add 1500 parts by volume of ethylacetate to the resulting concentrate before washing same twice with 1500 parts by volume (each) of water and twice with 750 parts by volume (each) of 2 N (aq.) sodium hydroxide. Dry the thus-washed organic phase over anhydrous magnesium sulfate, filter the dried organic phase and evaporate the solvent contained in the obtained filtrate to produce an oily residue. To this add absolute ethanol to crystallize the title compound. Recrystallize from absolute ethanol to obtain the desired product, M.P. 171.5° to 173.5°.

EXAMPLE 9

4-(biphenylyloxy)-(p-chlorophenoxy)malonic acid diethyl ester

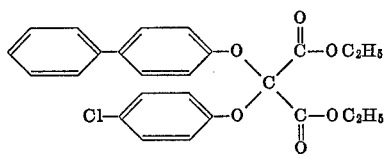

(a) Sodium hydride (56.7% in mineral oil), 47 g. (1.0 mole) is washed free from mineral oil with low boiling petroleum ether and suspended in 750 ml. of dimethylacetamide. To the suspension is added 129 g. (1.0 mole) of p-chlorophenol in 500 ml. of dimethylacetamide in a manner so as to maintain the temperature of the mixture at about 10 to 20° C. The mixture is then stirred for two hours, 195 g. (1.0 mole) of diethylchloromalonate added and the resulting mixture stirred at 80° C. for five hours and then at room temperature for 72 hours. The resulting mixture is then poured over two liters of ice water, extracted with 750 ml. of isopropyl ether and the separated organic layer extracted with cold 1 N sodium hydroxide. The organic layer is then dried over anhydrous sodium, sulfate, filtered and evaporated to yield (p-chlorophenoxy)malonic acid diethyl ester.

Recrystallization from petroleum ether at 60° C. affords product, M.P. 44–46° C.

(b) To one liter of carbon tetrachloride is added 170 g. (0.59 mole) of p-(chlorophenoxy)malonic acid diethyl ester. While stirring at room temperature, 94.2 g. (0.59 mole) of bromine is added dropwise and the mixture stirred for 17 hours at room temperature and then at reflux for 2 hours. The mixture is then washed with 500 ml. of water and then 100 ml. of cold 10% aqueous sodium bicarbonate. The organic layer is then separated, dried over anhydrous sodium sulfate and evaporated to yield α-bromo-p-chlorophenoxy-malonic acid diethyl ester. Fractionation affords product, B.P. 131°/0.05 mm.

(c) To 200 ml. of dimethylacetamide is added 17 g. (0.1 mole) of p-phenylphenol and the resulting mixture added dropwise, with stirring, to a suspension of 4.6 g. (0.1 mole) of 56.7% sodium hydride (previously washed free of mineral oil with petroleum ether) in 100 ml. of dimethylacetamide. The resulting mixture is stirred at room temperature for 90 minutes and 36.5 g. (0.1 mole) of α-bromo-p-chlorophenoxy-malonic acid diethyl ester in 50 ml. of dimethylacetamide is added in several portions. The mixture is then stirred with 1 g. of potassium iodide at room temperature for 72 hours, then at 50° C. for 30 minutes and then poured over 1500 ml. of ice water, and extracted with 500 ml. of isopropyl ether. The ether layer is then extracted with 100 ml. of cold 1 N sodium hydroxide, dried over anhydrous sodium sulphate, filtered and evaporated to yield (4-biphenylyloxy)-p-chlorophenoxy)malonic acid diethyl ester, M.P. 79–81° C.

EXAMPLE 10

(p-Chlorophenoxy)-(p-bromophenoxy)malonic acid diethyl ester

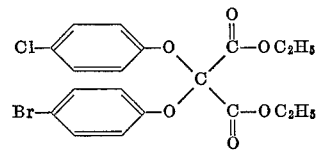

Following the procedure for Example 9 and employing an equivalent amount of p-bromophenol in place of the p-phenylphenol used in Step C of Example 9, there is obtained the product (p-chlorophenoxy)-(p-bromophenoxy)malonic acid diethyl ester, M.P. 55–56° C.

EXAMPLE 11

(p-Chlorophenoxy)-(p-fluorophenoxy)malonic acid diethyl ester

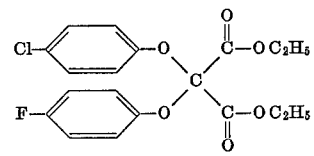

Following the procedure for Example 9 and employing an equivalent amount of p-fluorophenol in place of the p-phenylphenol used in Step C of Example 9, there is obtained the product (p-cholorphenoxy)-(p-fluorophenoxy)malonic acid diethyl ester, B.P. 160° C./0.25 mm. Crystallization from petroleum ether affords crystalline product, M.P. 40–41° C.

EXAMPLE 12

Bis-(p-benzoylphenoxy)malonic acid diethyl ester

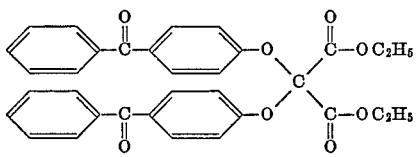

Following the procedure of Example 4 and employing an equivalent amount of p-hydroxybenzophenone in place of p-chlorophenol used therein, there is obtained the product bis-(p-benzoylphenoxy)malonic acid diethyl ester as an oil.

EXAMPLE 13

Bis-(3,4-dichlorophenoxy)malonic acid diethyl ester

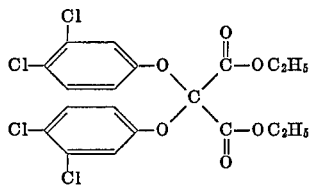

Following the procedure of Example 4 and employing an equivalent amount of 3,4-dichlorophenol in place of p-chlorophenol used therein, there is obtained the product bis - (3,4 - dichlorophenoxy)malonic acid diethyl ester, M.P. 95–96° C.

EXAMPLE 14

Bis-(o-chlorophenoxy)malonic acid diethyl ester

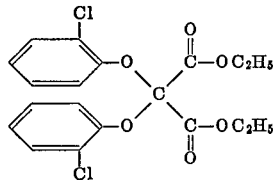

Following the procedure of Example 4 and employing an equivalent amount of o-chlorophenol in place of p-chlorophenol used therein, there is obtained the product bis-(o-chlorophenoxy)malonic acid diethyl ester, M.P. 111° C.

EXAMPLE 15

Bis-(4-chloro-2-nitrophenoxy)malonic acid diethyl ester

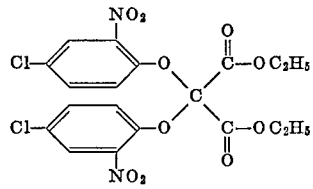

Following the procedure of Example 4 and employing an equivalent amount of 4-chloro-2-nitrophenol in place of p-chlorophenol used therein, there is obtained the product bis - (4 - chloro-2 - nitrophenoxy)malonic acid diethyl ester, M.P. 60–62° C.

EXAMPLE 16

Bis-(2,5-dichlorophenoxy)malonic acid diethyl ester

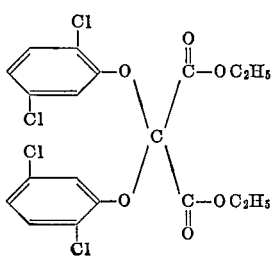

Following the procedure of Example 4 and employing an equivalent amount of 2,5-dichlorophenol in place of p-chlorophenol used therein, there is obtained the product bis-(2,5-dichlorophenoxy)malonic acid diethyl ester, M.P. 54–59° C.

EXAMPLE 17

Bis-(2,3-dichlorophenoxy)malonic acid diethyl ester

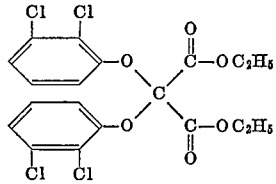

Following the procedure of Example 4 and employing an equivalent amount of 2,3-dichlorophenol in place of p-chlorophenol used therein, there is obtained the product bis-(2,3-dichlorophenoxy)malonic acid diethyl ester, M.P. 115–115.5° C.

EXAMPLE 18

Bis-(m-chlorophenoxy)malonic acid diethyl ester

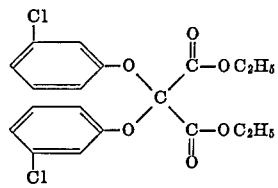

Following the procedure of Example 4 and employing an equivalent amount of m-chlorophenol in place of p-chlorophenol used therein, there is obtained the product bis-(m-chlorophenoxy)malonic acid diethyl ester, B.P. 120° C./0.015 mm.

EXAMPLE 19

Bis-(4-chloro-2-methylphenoxy)malonic acid diethyl ester

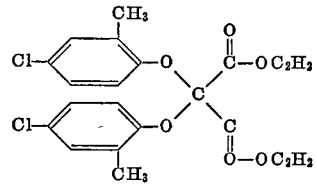

Following the procedure of Example 4 and employing an equivalent amount of 4-chloro-2-methylphenol in place of p-chlorophenol used therein, there is obtained the product bis-(4-chloro - 2 - methylphenoxy)malonic acid diethyl ester, M.P. 75–77° C.

EXAMPLE 20

Bis-(p-chlorophenoxy)malonic acid di-isopropyl ester

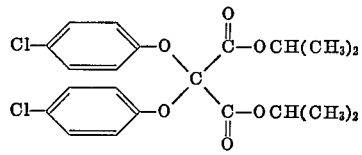

Step A: Preparation of bis-(p-chlorophenoxy)malonic acid.—To a mixture of 250 ml. of methanol and 20 ml. of water, heated slightly (30° C.) as a water bath, is added 16.1 g. (0.05 mole) of barium hydroxide. To the resulting practically-clear solution is added a solution of 20.65 g. (0.05 mole) of bis-(p-chlorophenoxy)malonic acid diethyl ester in 50 ml. of methanol. The resulting suspension is kept on the water bath for 15 minutes and the solids then filtered off and dried in an oven under high vacuum. The dried solids, 4.92 g., are suspended in 50 ml. of ethanol and a solution of 1.025 g. of concentrated sulfuric acid in 10 ml. of water is added to the suspension. The resulting mixture is agitated for ½ hour, the insoluble material filtered off and the filtrate evaporated at room temperature under high vacuum. The resulting oil is dissolved in 50 ml. of diethyl ether, the ether solution dried over magnesium sulfate and the solvent removed with a water aspirator. The oil thus obtained is crystallized from ethyl acetate-cyclohexane and the resulting solids recrystallized from ethyl acetate-cyclohexane to obtain bis-(p-chlorophenoxy)malonic acid, M.P. 159–150° C. (dec.).

Step. B: Preparation of bis-(p-chlorophenoxy)malonyl chloride.—To 106 g. of bis-(p-chlorophenoxy)malonic acid dissolved in 250 ml. of dry diethyl ether is added 65 ml. of thionyl chloride and 2 ml. of dimethylformamide. The mixture is refluxed for 4 hours and then the solvent and excess thionyl chloride evaporated at 40° C. under reduced pressure. Dry carbon tetrachloride, 100 ml., is then added and the resulting solution filtered and then evaporated at 40° C. under reduced pressure to yield bis-(p-chlorophenoxy)malonyl chloride as a viscous oil which crystallized slowly upon standing at room temperature. The crude crystalline material is washed with cold dry pentane and dried overnight at 20° C./0.1 mm. to yield analytically pure bis-(p-chlorophenoxy)malonyl chloride, M.P. 63–66° C., B.P. 154° C./0.15 mm.

Step C: Preparation of bis-(p-chlorophenoxy)malonic acid di-isopropyl ester.—To a stirred solution of 3.94 g. of bis-(p-chlorophenoxy)malonyl chloride in 10 ml. of diethyl ether is added 10 ml. of isopropanol and 2 g. of pyridine while maintaining the temperature of the reaction mixture at 0–5° C. by means of an external cooling bath. After the addition is completed, the cooling bath is removed and the temperature of the reaction mixture allowed to rise to 20° C. The reaction mixture is then filtered to remove the pyridine hydrochloride which formed and the filtrate evaporated. The resulting solid residue is dissolved in 50 ml. of diethyl ether and the resulting solution then treated with first 60 ml. of ice-water and then with 20 ml. of 2 N aqueous sodium hydroxide. The organic phase is then separated, washed twice with 100 ml. (each) of water, then dried over magnesium sulfate and evaporated to yield bis-(p-chloro-phenoxy)malonic acid di-isopropyl ester, M.P. 115° C. (after crystallization from isopropanol).

EXAMPLE 21

Bis-(p-chlorophenoxy)malonic acid di-t-butyl ester

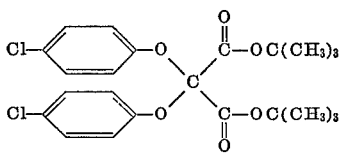

To 109 ml. of a solution of potassium tertiarybutylate in tertiary butyl alcohol (1 ml.=131 mg. of potassium tertiarybutylate) cooled to about 20° C. is slowly added with stirring a solution of 25 g. of bis-(p-chlorophenoxy) malonyl chloride in 60 ml. of diethyl ether while maintaining the temperature of the reaction mixture at about 20° C. by means of an external cooling bath. After the addition is completed, the mixture is stirred for an additional 10 minutes and then evaporated to dryness. To the resulting residue is added 200 ml. of diethyl ether and 100 ml. of ice-water. The organic phase is separated, extracted twice with 100 ml. (each) of water and then dried over magnesium sulfate. The ether is then evaporated off to yield bis-(p-chlorophenoxy)malonic acid di-t-butyl ester, M.P. 145° C. (after recrystallization from ethylacetate-low boiling petroleum ether).

EXAMPLE 22

Bis-(m-trifluoromethylphenoxy)malonic acid diethyl ester

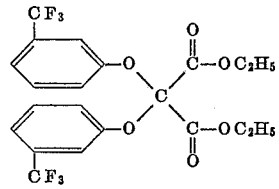

Following the procedure of Example 4 and employing an equivalent amount of m-trifluoromethylphenol in place of the p-chlorophenol used therein, there is obtained the product bis - (m - trifluoromethylphenoxy) malonic acid diethyl ester, B.P. 135° C./0.025 mm.

EXAMPLE 23

Bis-(2,4-dichlorophenoxy)malonic acid diethyl ester

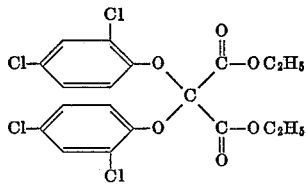

Following the procedure of Example 4 and employing an equivalent amount of 2,4-dichlorophenol in place of the p-chlorophenol used therein, there is obtained the product bis-(2,4-dichlorophenoxy)malonic acid diethyl ester, M.P. 73–74° C.

EXAMPLE 24

Bis-(3,5-dichlorophenoxy)malonic acid diethyl ester

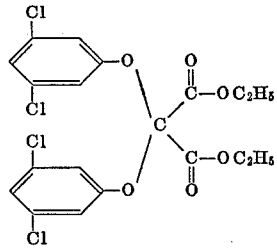

Following the procedure of Example 4 and employing an equivalent amount of 3,5-dichlorophenol in place of the p-chlorophenol used therein, there is obtained the product bis-(3,5-dichlorophenoxy)malonic acid diethyl ester, M.P. 62–63° C.

What is claimed is:
1. A compound of the formula

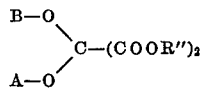

wherein:
A is either

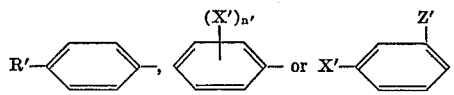

B is

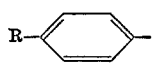

when A is either

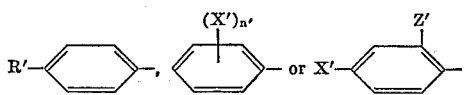

B is

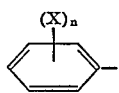

when A is either

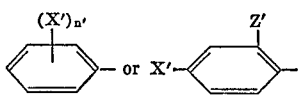

or
B is

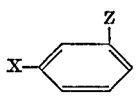

when A is

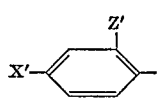

R is hydrogen, trifluoromethyl, loweralkanoylamido, loweralkylthio, or an aromatic moiety of the formula

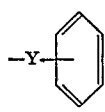

R' is trifluoromethyl, loweralkanoylamido, loweralkylthio, or an aromatic moiety of the formula

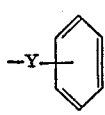

Y is either a direct bond or a bridging member of the group oxygen, sulfur, imino, carbonyl or straight chain loweralkylene;
X and X' are the same or different and represent halogen;
R'' represents loweralkyl;
Z and Z' are the same or different and represent loweralkyl or nitro; and
n and n' are the same or different and represent a whole number of from 1 to 3, inclusive.

2. A compound of claim 1 wherein B is

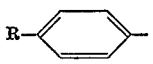

A is

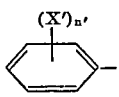

and R, R'', X' and n' are as defined in claim 1.

3. A compound of claim 1 wherein B is

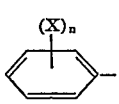

A is

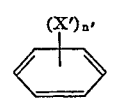

and X, X', n, n' and R'' are as defined in claim 1.

4. A compound of claim 1 wherein B is

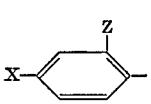

A is

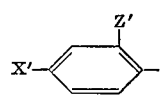

and X, X', Z, Z' and R'' are as defined in claim 1.

5. A compound of claim 1 wherein B is

A is

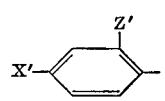

and R, R'', X' and Z' are as defined in claim 1.

6. A compound of claim 1 wherein B is

A is

and R, R' and R'' are as defined in claim 1.

7. A compound of claim 1 wherein A is

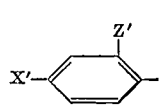

B is

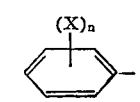

and X, X', Z', n and R'' are as defined in claim 1.

8. A compound of claim 1 wherein A, B and R'' are as defined with the provision that X and X' represent fluorine, chlorine or bromine.

9. A compound of claim 2 wherein A, B, R, R'' and n' are as defined in claim 2, and X' represents fluorine, chlorine or bromine.

10. A compound of claim 3 wherein A, B, n, n' and R'' are as defined in claim 3, and X and X' each independently represent fluorine, chlorine or bromine.

11. A compound of claim 4 wherein A, B, Z, Z' and R'' are as defined in claim 4, and X and X' each independently represent fluorine, chlorine or bromine.

12. A compound of claim 5 wherein A, B, R, R'' and Z' are as defined in claim 5, and X' represents fluorine, chlorine or bromine.

13. A compound of claim 7 wherein A, B, Z', n and R'' are as defined in claim 7, and X and X' each independently represent fluorine, chlorine or bromine.

14. The compound of claim 1 which is bis-(4-biphenylyloxy)malonic acid diethyl ester.

15. The compound of claim 1 which is bis-(p-chlorophenoxy)malonic acid diethyl ester.

16. The compound of claim 1 which is bis-(p-bromophenoxy)malonic acid diethyl ester.

17. The compound of claim 1 which is (4-biphenylyloxy)-(p-chlorophenoxy)malonic acid diethyl ester.

18. The compound of claim 1 which is (p-chlorophenoxy)-(p-bromophenoxy)malonic acid diethyl ester.

19. The compound of claim 1 which is (p-chlorophenoxy)-(p-fluorophenoxy)malonic acid diethyl ester.

20. The compound of claim 1 which is bis-(3,4-dichlorophenoxy)malonic acid diethyl ester.

21. The compound of claim 1 which is bis-(m-chlorophenoxy)malonic acid diethyl ester.

22. The compound of claim 1 which is bis-(p-chlorophenoxy)malonic acid dimethyl ester.

23. The compound of claim 1 which is bis-(p-trifluoromethylphenoxy)malonic acid diethyl ester.

24. The compound of claim 1 which is bis-(p-chlorophenoxy)malonic acid di-isopropyl ester.

25. The compound of claim 1 which is bis-(p-chlorophenoxy)malonic acid di-t-butyl ester.

26. The compound of claim 1 which is bis-(m-trifluoromethylphenoxy)malonic acid diethyl ester.

27. The compound of claim 1 which is bis-(2,4-dichlorophenoxy)malonic acid diethyl ester.

References Cited

Gilbert et al.: Bull. Soc. Chim., France 1965, No. 10, 2979.

Niederl et al.: J. Am. Chem. Soc., vol. 62, 1154 (1940).

LORRAINE A. WEINBERGER, Primary Examiner

M. G. BERGER, Assistant Examiner

U.S. Cl. X.R.

260—470, 471, 516, 518, 519, 520, 544; 424—308, 309